(12) United States Patent
Suzuki et al.

(10) Patent No.: US 10,291,088 B2
(45) Date of Patent: May 14, 2019

(54) PERMANENT MAGNET TYPE ROTATING ELECTRIC MACHINE

(71) Applicant: KABUSHIKI KAISHA TOYOTA JIDOSHOKKI, Aichi-ken (JP)

(72) Inventors: Noriyuki Suzuki, Kariya (JP); Yoshiyuki Nakane, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 211 days.

(21) Appl. No.: 15/435,380

(22) Filed: Feb. 17, 2017

(65) Prior Publication Data

US 2017/0244291 A1 Aug. 24, 2017

(30) Foreign Application Priority Data

Feb. 19, 2016 (JP) ................................. 2016-029859

(51) Int. Cl.
*H02K 1/27* (2006.01)
*H02K 7/14* (2006.01)
(Continued)

(52) U.S. Cl.
CPC ........... *H02K 1/2706* (2013.01); *H02K 1/276* (2013.01); *H02K 7/14* (2013.01); *H02K 21/16* (2013.01); *H02K 29/03* (2013.01)

(58) Field of Classification Search
CPC ........ H02K 1/276; H02K 1/2706; H02K 7/14; H02K 21/16; H02K 29/03
(Continued)

(56) References Cited

U.S. PATENT DOCUMENTS

| 5,548,172 A * | 8/1996 | Kliman | H02K 1/2726 |
| | | | 310/156.53 |
| 6,509,664 B2 * | 1/2003 | Shah | H02K 21/042 |
| | | | 310/156.19 |
| 6,784,585 B2 * | 8/2004 | Shah | H02K 21/042 |
| | | | 310/156.28 |
| 7,573,168 B2 * | 8/2009 | Carl, Jr. | H02K 1/276 |
| | | | 310/156.08 |

(Continued)

FOREIGN PATENT DOCUMENTS

| JP | 2008-206308 | 9/2008 |
| JP | 2012-110214 | 6/2012 |

(Continued)

OTHER PUBLICATIONS

Japanese Office Action in related application No. 2016-029859, dated Apr. 3, 2018.

*Primary Examiner* — John K Kim
(74) *Attorney, Agent, or Firm* — Greenblum & Bernstein, P.L.C.

(57) ABSTRACT

A permanent magnet type rotating electric machine includes a stator, a rotor core including magnet insertion holes, and permanent magnets inserted into the magnet insertion holes and fixed to the rotor core. The permanent magnets include N-pole magnets and S-pole magnets. The N-pole magnets are arranged adjacent to each other in a circumferential direction and form a first set. The S-pole magnets are arranged adjacent to each other in the circumferential direction and form a second set. The first set and the second set are arranged along the same circumference. The rotor core includes an outer circumferential portion that includes a groove at a location corresponding to a position between the N-pole magnets and a groove at a location corresponding to a position between the S-pole magnets.

6 Claims, 4 Drawing Sheets

(51) Int. Cl.
*H02K 21/16* (2006.01)
*H02K 29/03* (2006.01)

(58) Field of Classification Search
USPC .................................................. 310/156.56
See application file for complete search history.

(56) References Cited

U.S. PATENT DOCUMENTS

| | | | | |
|---|---|---|---|---|
| 9,508,479 | B1* | 11/2016 | Buskirk | H01F 13/003 |
| 2011/0210637 | A1* | 9/2011 | Reutlinger | H02K 1/276 |
| | | | | 310/181 |
| 2011/0309706 | A1* | 12/2011 | Takahashi | H02K 1/276 |
| | | | | 310/156.53 |
| 2012/0091845 | A1 | 4/2012 | Takemoto et al. | |
| 2013/0141024 | A1 | 6/2013 | Wu et al. | |
| 2013/0169094 | A1* | 7/2013 | Lee | H02K 1/276 |
| | | | | 310/156.01 |
| 2014/0333168 | A1* | 11/2014 | Bouarroudj | H02K 1/2773 |
| | | | | 310/156.56 |
| 2015/0194849 | A1* | 7/2015 | Kayano | H02K 1/2766 |
| | | | | 310/156.53 |
| 2016/0218651 | A1 | 7/2016 | Wu et al. | |
| 2016/0218653 | A1 | 7/2016 | Wu et al. | |
| 2016/0218654 | A1 | 7/2016 | Wu et al. | |
| 2017/0244291 | A1* | 8/2017 | Suzuki | H02K 21/16 |

FOREIGN PATENT DOCUMENTS

| | | |
|---|---|---|
| JP | 2013-523065 | 6/2013 |
| JP | 5747385 | 7/2015 |

* cited by examiner

PERMANENT MAGNET TYPE ROTATING ELECTRIC MACHINE

BACKGROUND

The present invention relates to a permanent magnet type rotating electric machine and, more particularly, to a permanent magnet type rotating electric machine in which permanent magnets are embedded in a rotor core.

In a three-phase AC induction motor, the rotation speed is inversely proportional to the number of phases. Thus, two phases are preferable for high-speed rotation. In a two phase interior permanent magnet (IPM) motor rotating at a high speed, the centrifugal force applied to the permanent magnets increases the stress applied to the rotor core. When the rotor core is thin at a portion between the permanent magnets and the outer circumferential surface of the rotor core, stress may break the rotor core.

The thickness of the rotor core may be increased at the portion between the permanent magnets and the outer circumferential surface of the rotor core to prevent breakage of the rotor. However, this will lower the torque.

The IPM motor may have substantially two poles in which each pole corresponds to a plurality of permanent magnets so that centrifugal force acting on the individual permanent magnets is reduced. However, this will increase leakage flux and lower the torque.

Japanese Laid-Open Patent Publication No. 2012-110214 describes a brushless motor provided with a rotor that includes a plurality of magnet pole portions arranged in the circumferential direction of the rotor core to limit demagnetization and to increase the torque and improve the rotation performance. An N-pole magnet is embedded in each magnet pole portion. The rotor core includes a core pole portion that functions as an S-pole between the magnet pole portions that are adjacent in the circumferential direction. Gaps extend between the core pole portions and the magnet pole portions. The gaps between the magnet pole portions and the core pole portions extend toward the radially outer side of the magnets.

SUMMARY

In the motor of Japanese Laid-Open Patent Publication No. 2012-110214, the core pole portions that function as the S-poles exist between the N-pole permanent magnets. That is, the magnet pole portions and the core pole portions are alternately arranged in the circumferential direction. The number of poles in the motor is the total of the number of the magnet pole portions and the number of the core pole portions. Thus, in the structure described in Japanese Laid-Open Patent Publication No. 2012-110214, a motor having substantially two poles cannot be realized. Further, Japanese Laid-Open Patent Publication No. 2012-110214 does not disclose or hint manufacturing an IPM motor having substantially two poles in which each pole corresponds to a plurality of permanent magnets, which will increase leakage flux and lower the torque.

It is an object of the present invention to provide a permanent magnet type rotating electric machine that allows for high-speed rotation, increases the torque, and improves torque pulsation.

To achieve the above object, the present invention provides a permanent magnet type rotating electric machine including a stator, a rotor core, and permanent magnets. The rotor core includes magnet insertion holes. The permanent magnets are respectively inserted into the magnet insertion holes and fixed to the rotor core. The permanent magnets include N-pole magnets, each of which an N-pole is opposed to the stator, and S-pole magnets, each of which an S-pole is opposed to the stator. The N-pole magnets are arranged adjacent to each other in a circumferential direction and form a first set. The S-pole magnets are arranged adjacent to each other in the circumferential direction and form a second set. The first set and the second set are arranged along the same circumference. The rotor core includes an outer circumferential portion that includes a groove at a location corresponding to a position between the N-pole magnets that are adjacent to each other in the circumferential direction and a groove at a location corresponding to a position between the S-pole magnets that are adjacent to each other in the circumferential direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of the present invention will now be described with reference to FIGS. 1A to 6B.

Figure 1A:
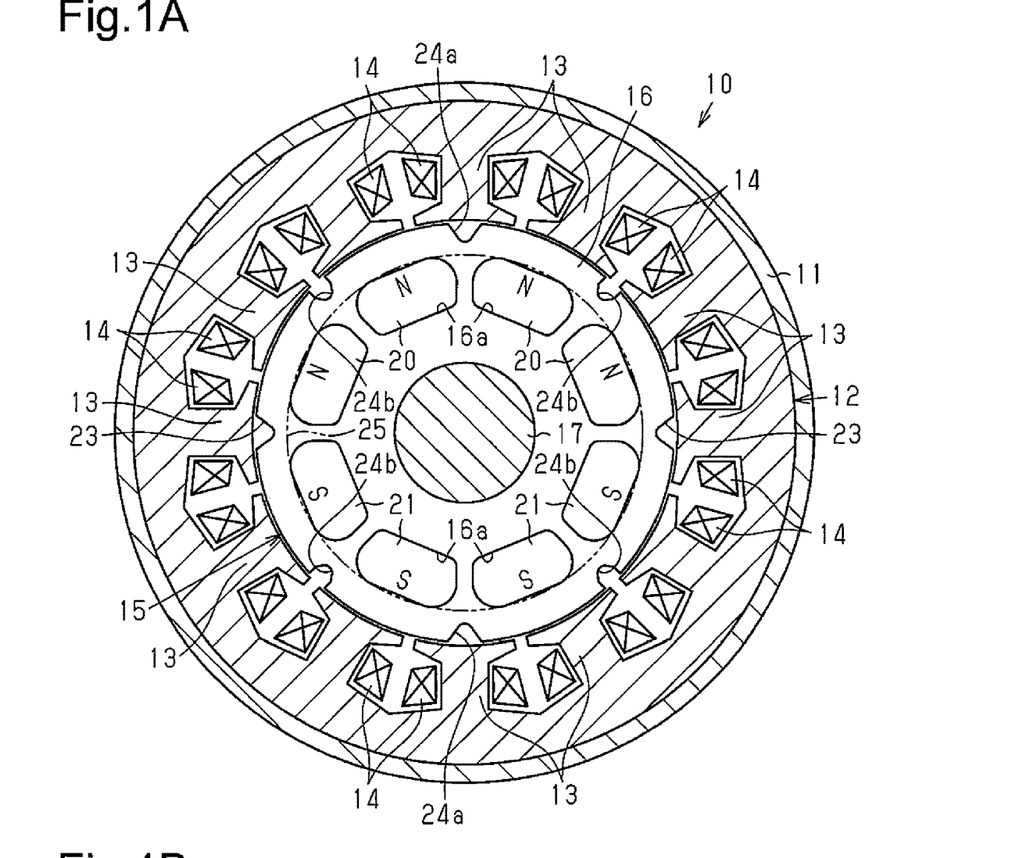
FIG. 1A is a schematic cross-sectional view of a permanent magnet type rotating electric machine.

As shown in FIG. 1A, an IPM motor 10 (interior permanent magnet type rotating electric machine) that serves as a permanent magnet type rotating electric machine includes a housing 11 and a tubular stator 12, which is fixed to the inner circumferential surface of the stator 12. The stator 12 includes teeth 13 that extend radially inward and are arranged at equal angular intervals. Coils 14 are wound around the teeth 13.

A rotor 15 is arranged at a radially inner side of the stator 12. The rotor 15 includes a rotor core 16, which is formed by stacking a plurality of (e.g., several tens of) circular magnetic steel sheets. A rotation shaft 17 is fitted into and fixed to the center of the rotor core 16 so as to be rotatable integrally with the rotor core 16. The rotation shaft 17 is supported by bearings (not shown) to be rotatable relative to the housing 11.

The rotor core 16 includes magnet insertion holes 16a. Permanent magnets 20 and 21 are inserted into and fixed to the magnet insertion holes 16a. The permanent magnets 20 are arranged along the same circumference over one-half of the rotor core 16, and the permanent magnets 21 are arranged along the same circumference over the remaining half of the rotor core 16. That is, the rotor 15 includes the permanent magnets 20 and 21 that are arranged on the same circumference. More specifically, the rotor 15 includes the permanent magnets 20, each serving as an N-pole magnet in which the N-pole is opposed toward the stator 12, and the permanent magnets 21, each serving as an S-pole magnet, in which the S-pole is opposed toward the stator 12. A first set of N-pole magnets (permanent magnets 20), arranged adjacent to one another in the circumferential direction, and a second set of S-pole magnets (permanent magnets 21), arranged adjacent to one another in the circumferential direction, are fixed to the rotor core 16 along the same circumference. The permanent magnets 20 and 21 have the same size, and the permanent magnets 20 and the permanent magnets 21 are located at symmetric positions in the rotor core 16. The permanent magnets 20 are three or more in number, and the permanent magnets 21 are three or more in number. In this embodiment, there are four permanent magnets 20 and four permanent magnets 21.

The IPM motor 10 includes the stator 12, the rotor core 16 including the magnet insertion holes 16a, and the permanent magnets 20 and 21 inserted into the magnet insertion holes 16a and fixed to the rotor core 16.

The outer circumferential portion of the rotor core 16 includes generally V-shaped grooves 23 at locations corresponding to positions between the set of the permanent magnets 20 and the set of the permanent magnets 21 that are adjacent to each other in the circumferential direction.

In the outer circumferential portion of the rotor core 16, among the three locations corresponding to positions between the N-pole magnets 20 that are adjacent to one another in the circumferential direction, the middle location includes a generally V-shaped groove 24a and the two remaining locations each include a groove 24b, which is narrower than the groove 24a.

Further, in the outer circumferential portion of the rotor core 16, among the three locations corresponding to positions between the S-pole magnets 21 that are adjacent to one another in the circumferential direction, the middle location includes the generally V-shaped groove 24a and the two remaining locations each include the groove 24b, which is narrower than the groove 24a.

The outer circumferential portion of the rotor core 16 refers to the portion of the rotor core 16 located at the radially outer side of the permanent magnets 20. In detail, the outer circumferential portion refers to the portion of the rotor core 16 located at a radially outer side of a hypothetical line 25 that connects outer surfaces of the permanent magnets 20 and 21. The radially outer side refers to the outer side in the radial direction of the rotation shaft 17.

The locations corresponding to positions between the set of the permanent magnets 20 (N-pole magnets) and the set of the permanent magnets 21 (S-pole magnets) refers to locations in the outer circumferential portion of the rotor core 16 that are overlapped in the radial direction with locations between the set of the permanent magnets 20 and the set of the permanent magnets 21 that are adjacent to each other in the circumferential direction of the rotor core 16.

Figure 1B:
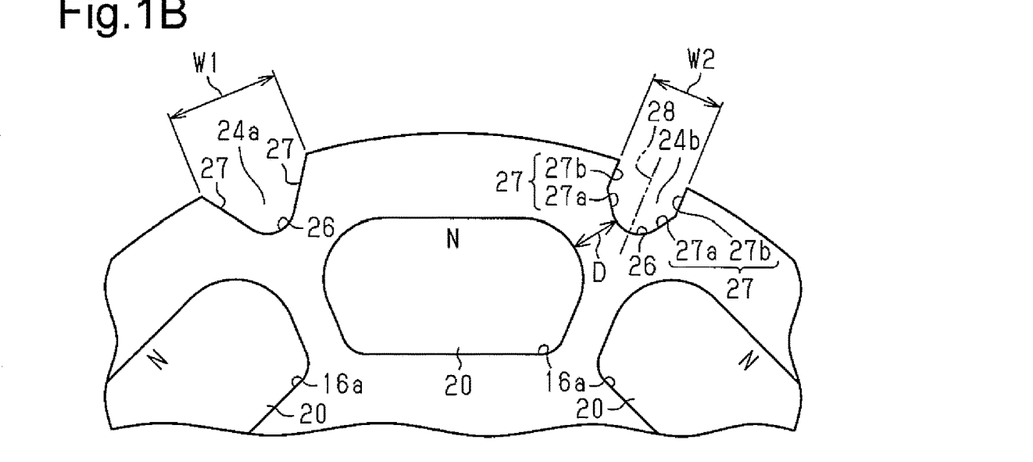
FIG. 1B is a schematic enlarged plan view showing a portion of a rotor in the permanent magnet type rotating electric machine of FIG. 1A.

The grooves 23, 24a, and 24b each include a bottom surface located at a radially outer side of the hypothetical line 25 that connects the outer surfaces of the permanent magnets 20 and 21. The grooves 23 and 24a are identical in shape.

Among the two surfaces of each of the permanent magnets 20 and 21 that extend in a direction intersecting the radial direction of the rotor core 16, the outer surface of each of the permanent magnets 20 and 21 refers to the surface that is closer to the outer circumferential surface of the rotor core 16. That is, the outer surface of each of the permanent magnets 20 and 21 refers to the radially outer surface.

As shown in FIG. 1B, each groove 24a includes an arcuate bottom surface 26 and two side surfaces 27 that are continuous with the bottom surface 26. The side surfaces 27 are planar surfaces that are smoothly continuous with the arcuate bottom surface 26. The distance increases between the side surfaces 27 as the bottom surface 26 becomes farther. Thus, the groove 24a has a generally V-shaped cross-section. The grooves 24b and the grooves 24a have substantially the same depth. Each permanent magnet 20 is separated from the corresponding groove 24a and from the corresponding groove 24b by the same distance D. Each permanent magnet 21 is also separated from the corresponding groove 24a and the corresponding groove 24b by the same distance D. A magnetic path is formed between the permanent magnets 20 and 21 and the grooves 23, 24a, and 24b. The magnetic path narrows as the distance D decreases. Each groove 24b includes a bottom surface 26 that has the same radius of curvature as the bottom surface 26 of each groove 24a. Further, the groove 24b includes two side surfaces 27 that are continuous with the bottom surface 26.

Each groove 24b has a generally U-shaped cross-section so that the width W2 of the groove 24b is narrower than the width W1 of each groove 24a. The width at the open end of each groove 24b opposing the stator 12 is narrower than the width at the open end of each groove 24a opposing the stator 12. In detail, each side surface 27 of the groove 24b includes a planar surface 27a that is smoothly continuous with the arcuate bottom surface 26 and a planar surface 27b that is continuous with the planar surface 27a.

More specifically, the two planar surfaces 27a are formed so that the distance between the two planar surfaces 27a increases as the bottom surface 26 becomes farther. The two planar surfaces 27b are formed so that the distance between the two planar surfaces 27b is constant. That is, the two planar surfaces 27b are parallel to each other.

The operation of the IPM motor 10 will now be described.

When the IPM motor 10 is driven under a load condition, current is supplied to the coils 14 of the stator 12. This generates a rotating magnetic field at the stator 12 that acts on the rotor 15. The magnetic attraction force and magnetic repulsion force between the rotating magnetic field and the permanent magnets 20 and 21 rotates the rotor 15 synchronously with the rotating magnetic field.

In order for the magnetic flux generated at the permanent magnets 20 (N-pole magnets), of which the N-poles are opposed to the stator 12, to efficiently contribute to the rotation of the rotor 15, the magnetic flux generated at the permanent magnets 20 needs to be input to a tooth 13 and flow via a different tooth 13 into the permanent magnets 21 (S-pole magnets), of which the S-poles are opposed to the stator 12.

Figure 2A:
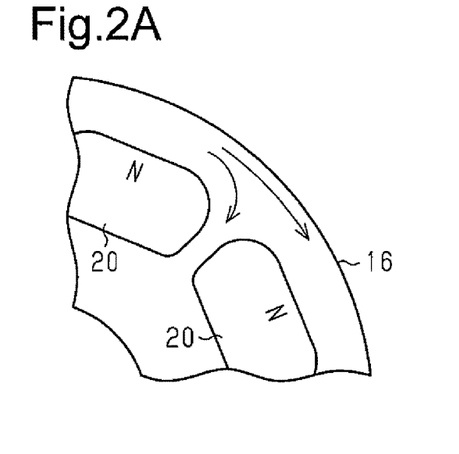
FIG. 2A is a schematic view illustrating the flow of magnetic flux in a rotor that is less a notch.
Figure 2B:
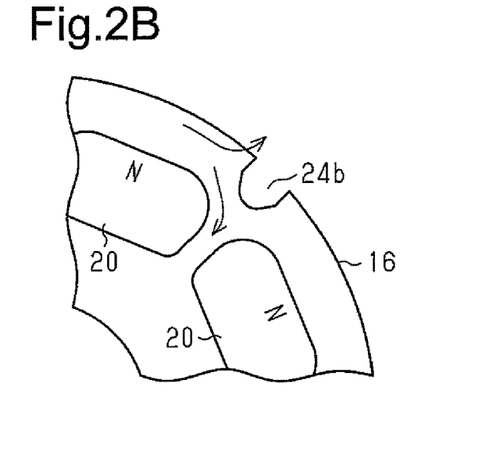
FIG. 2B is a schematic view illustrating the flow of magnetic flux in the rotor of FIG. 1B that includes notches.

As shown in FIG. 2A, in a case in which the outer circumferential surface of the rotor core 16 does not include the grooves 24a and 24b, some of the magnetic flux generated at the permanent magnets 20 is apt to flow along the outer circumferential portion of the rotor core 16. Further, some of the magnetic flux generated at the permanent magnets 20 flows between the opposing surfaces of the permanent magnets 20 that are adjacent to each other. However, as shown in FIG. 2B, in a case in which the outer circumferential surface of the rotor core 16 includes the grooves 24a and 24b (only groove 24b shown), the flow of the magnetic flux generated at the permanent magnets 20 is restricted in the circumferential direction of the rotor core 16. Thus, the magnetic flux efficiently flows toward the stator 12. Further, the magnetic flux flowing from the teeth 13 to the rotor 15 is apt to flow toward the permanent magnets 21, of which the S-poles are opposed to the stator 12, and into the rotor core 16. In addition, the magnetic path between the same poles (portion of distance D) is narrowed to reduce leakage flux. Thus, the magnetic flux generated at the permanent magnets 20 efficiently flows toward the stator 12 and increases the torque.

Figure 3:
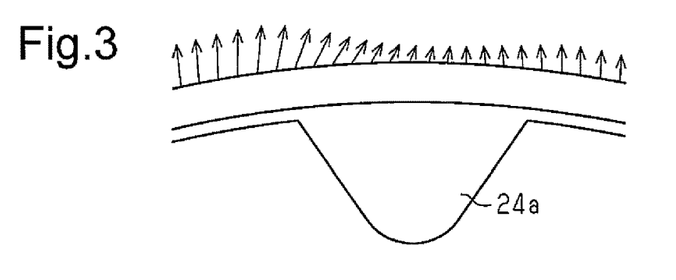
FIG. 3 is a vector diagram illustrating the surface force applied to the teeth when the rotation angle is 1°.
Figure 4A:
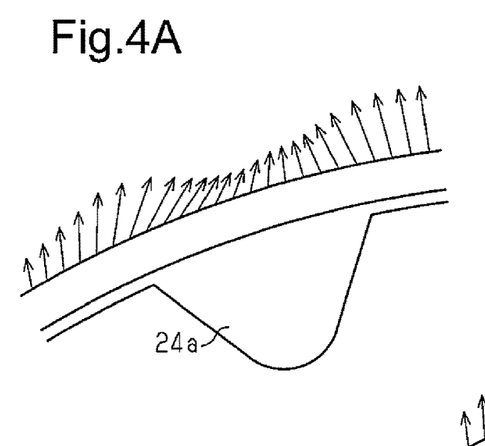
FIG. 4A is a vector diagram illustrating the surface force applied to the teeth when the rotation angle is 108° and a groove has a generally V-shaped cross section.
Figure 4B:
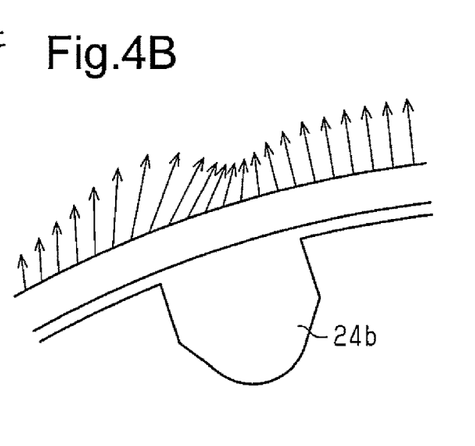
FIG. 4B is a vector diagram illustrating the surface force applied to the teeth when the rotation angle is 108° and a groove has a generally U-shaped cross section.

When using vector lines to indicate the teeth torque, which is the total of the rotation direction components of the surface force applied to each stator tooth, the length and direction of vector lines change at locations corresponding to the grooves 24a and 24b. As shown in FIGS. 3 and 4A, the length and direction of the vector lines change at locations corresponding to the grooves 24a that are identical in shape in accordance with the rotation angle. Further, as shown in FIGS. 4A and 4B, even when the rotation angle is the same, the length and direction of the vector lines differ at locations corresponding to the grooves 24a and the grooves 24b that are shaped differently. FIG. 3 shows the vectors at the rotation angle of 1°, FIG. 4A shows the vectors at the rotation angle of 108° at a location corresponding to the groove 24a that has a generally V-shaped cross section, and FIG. 4B shows the vectors at the rotation angle of 108° at a location corresponding to the groove 24b that has a generally U-shaped cross section.

Figure 5A:
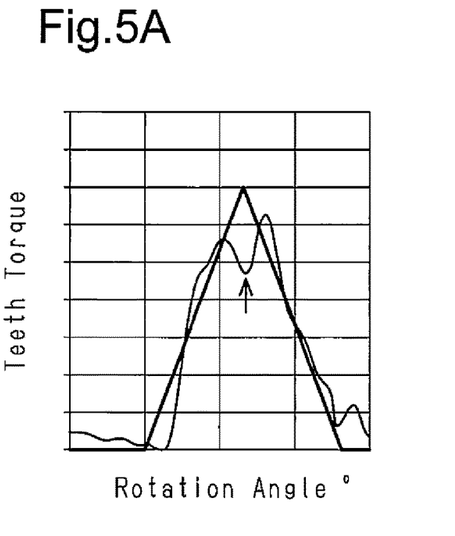
FIG. 5A is a graph showing changes in the teeth torque relative to the rotation angle when the groove has a generally V-shaped cross section.
Figure 5B:
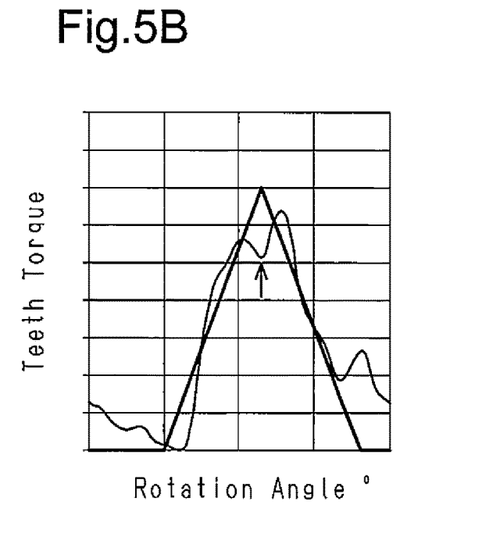
FIG. 5B is a graph showing changes in the teeth torque relative to the rotation angle when the groove has a generally U-shaped cross section.

FIGS. 5A and 5B show the relationship of the teeth torque and the rotation angle. In FIGS. 5A and 5B, the bold line indicates the ideal change of the teeth torque and the fine line indicates the actual change of the teeth torque. As shown in FIGS. 5A and 5B, in the ideal line, the peak is near 108°, and the vector at the rotation angle of 1° becomes smaller as the ideal line becomes closer. Thus, as shown in FIG. 3, each groove 24a has a generally V-shaped cross-section and is set to be spaced apart by a large gap from the stator 12.

The teeth torque at rotation angle 108° becomes closer to the ideal line as the vector becomes larger. As shown in FIGS. 4A and 4B, the vectors are large and extend toward the stator 12 at locations corresponding to the grooves 24b having the generally U-shaped cross sections than locations corresponding to the grooves 24a that have the generally V-shaped cross sections. Thus, as shown in FIG. 4B, each groove 24b is formed to have a generally U-shaped cross-section, and each groove 24b is formed so that the width narrows at portions closer to the stator 12.

As a result, as compared with when the grooves in the outer circumferential surface of the rotor core 16 all have generally V-shaped cross-sections (FIG. 5A), the vector at rotation angle 108° becomes larger and approaches the ideal line when the outer circumferential surface of the rotor core 16 includes the grooves 24b having the generally U-shaped cross sections (FIG. 5B).

Figure 6A:
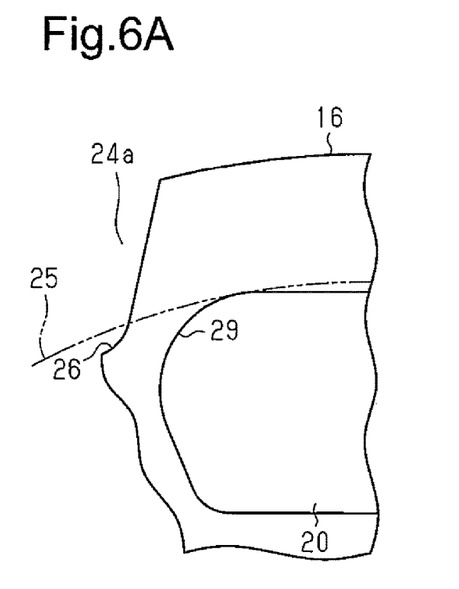
FIGS. 6A to 6B are schematic views illustrating stress at a support point in the rotor of FIG. 1B.
Figure 6B:
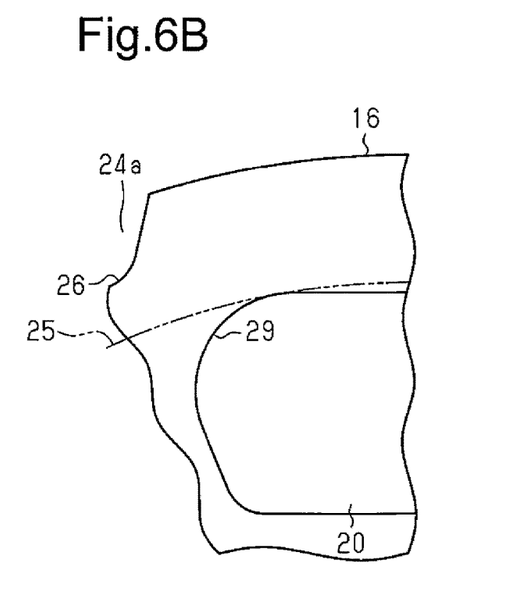

As shown in FIG. 6A, when the bottom surface 26 of each groove 24a is located at the radially inner side of the hypothetical line 25 that connects the outer surfaces of the permanent magnets 20 and 21, the rotation of the rotor core 16 produces centrifugal force that acts on the permanent magnets 20. This suddenly increases the stress at a support point 29 of the rotor core 16 that is opposed to the bottom surface 26 of each groove 24a. The suddenly increased stress is approximately 1.4 times the stress produced at the support point 29 of the rotor core 16 opposed to the bottom surface 26 of each groove 24a when the bottom surface 26 of each groove 24a is located at the radially outer side of the hypothetical line 25 that connects the outer surfaces of the permanent magnets 20 and 21 as shown in FIG. 6B. Thus, it is preferred that the grooves 24a and 24b be shaped so that the corresponding bottom surfaces 26 are located at the radially outer side of the hypothetical line 25 that connects the outer surfaces of the permanent magnets 20 and 21.

The present embodiment has the advantages described below.

(1) The IPM motor 10 (permanent magnet type rotating electric machine) includes the stator 12, the rotor core 16 including the magnet insertion holes 16a, and the permanent magnets 20 and 21 that are inserted into the magnet insertion holes 16a and fixed to the rotor core 16. The permanent magnets 20 and 21 include the N-pole magnets (permanent magnets 20) of which the N-poles are opposed to the stator 12 and the S-pole magnets (permanent magnets 21) of which the S-poles are opposed to the stator 12. The N-pole magnets are arranged adjacent to one another in the circumferential direction and form the first set, and the S-pole magnets are arranged adjacent to one another in the circumferential direction and form the second set. The first set and the second set are arranged on the same circumference. The outer circumferential portion of the rotor core 16 includes the grooves 24a and 24b at locations corresponding to positions between N-pole magnets that are adjacent to each other in the circumferential direction and locations corresponding to positions between S-pole magnets that are adjacent to each other in the circumferential direction.

The IPM motor 10 includes a total of four or more of the permanent magnets 20 and 21. However, the permanent magnets 20 of which the N-poles are opposed to the stator 12 are arranged next to one another, and the permanent magnets 21 of which the S-poles are opposed to the stator 12 are arranged next to one another. Thus, the IPM motor 10 functions as a rotating electric machine having substantially two poles and is thus suitable for high-speed rotation. The two magnetic poles are formed by the permanent magnets 20 and the permanent magnets 21 respectively. That is, each of the two magnetic poles is not formed by a single permanent magnet. This minimizes problems that would occur when centrifugal force acts on the permanent magnets 20 and 21. Further, the grooves 24a and 24b are arranged between adjacent ones of the permanent magnets 20 and adjacent ones of the permanent magnets 21. This restricts the flow of magnetic flux in the circumferential direction of the rotor core 16 when the magnetic flux flows from the permanent magnets 20 toward the stator 12. Thus, the magnetic flux efficiently flows to the stator 12. Further, the narrowed magnetic path between the same poles (locations of distance D) reduces leakage flux. Thus, with the IPM motor 10, high-speed rotation may be performed, the torque is increased, and torque pulsation is improved.

(2) There are three or more of the N-pole magnets (permanent magnets 20) and three or more of the S-pole magnets (permanent magnets 21). Among the three permanent magnets of the same pole that are successively arranged in the circumferential direction, when the permanent magnet located in the middle is referred to as the first permanent magnet and the permanent magnets located at the two sides of the first permanent magnet in the circumferential direction are referred to as the second and third permanent magnets, the width of the groove 24b located at a portion corresponding to a position between the first and second permanent magnets is narrower than the width of the groove 24a located between the first and third permanent magnets.

The stator 12 of the IPM motor 10 (rotating electric machine) includes teeth 13 (stator teeth). The motor torque is the total of the rotation direction components of the surface force applied to the stator teeth. The torque pulsation decreases as the relationship of the rotation angle and the torque applied to a single tooth (teeth torque) approaches the ideal line. Among the two grooves 24a and 24b in the outer circumferential portion of the rotor core 16 that correspond to positions between adjacent ones of three permanent magnets 20 (permanent magnets 21) having the same pole, the groove 24b has a narrower width than the groove 24a. Thus, the relationship of the rotation angle and the teeth torque approaches the ideal line. This decrease the torque pulsation in comparison to when the grooves 24a and 24b have the same width.

(3) Each of the grooves 24a and 24b includes the arcuate bottom surface 26 and the planar side surfaces 27 that are continuous with the bottom surface 26. The arcuate bottom surfaces 26 of the grooves 24a and 24b effectively reduce the concentration of stress. When narrowing the width of the grooves 24b, the side surfaces 27 that are continuous with the bottom surface 26 may also be arcuate. However, when the side surfaces 27, which are continuous with the bottom surface 26, are arcuate, the width of the groove 24b may narrow at portions closer to the open end of the groove 24b depending on the depth of the groove 24b. Such a structure has a tendency of producing leakage flux and is thus not preferable.

(4) The bottom surfaces 26 of the grooves 24a and 24b are formed as arcuate surfaces having the same radius of curvature. The stress reduction effect differs in accordance with the radius of curvature of the bottom surface 26. Thus, when the bottom surface 26 of the grooves 24a and 24b have different radius of curvatures and the radius of curvature of the bottom surface 26 of one of the grooves 24a and 24b is set to obtain a relatively superior stress reduction effect, the bottom surface 26 of the other one of the grooves 24a and 24b will obtain a relatively inferior stress reduction effect. However, when the bottom surfaces 26 of the grooves 24a and 24b have the same radius of curvature, the bottom surfaces 26 of the grooves 24a and 24b will both have the same stress reduction effect.

(5) The bottom surfaces 26 of the grooves 24a and 24b are located at the radially outer side of the hypothetical line 25 that connects the radially outer surfaces of the permanent magnets 20 and 21. When the bottom surfaces 26 of the grooves 24a and 24b are located at the radially inner side of the hypothetical line 25, the rotation of the rotor core 16 produces centrifugal force that acts on the permanent magnets 20 and 21. This suddenly increases the stress at the support points 29 of the rotor core 16 that are opposed to the bottom surfaces 26 of the grooves 24a and 24b. Thus, it is preferred that the bottom surfaces 26 of the grooves 24a and 24b be located at the radially outer side of the hypothetical line 25 that connects the radially outer surfaces of the permanent magnets 20 and 21.

(6) The IPM motor 10 is used as a rotating electric machine for a centrifugal compressor. The IPM motor 10 is suitable for high-speed rotation and may thus be effectively used as a rotating electric machine for a centrifugal compressor.

It should be apparent to those skilled in the art that the present invention may be embodied in many other specific forms without departing from the spirit or scope of the invention. Particularly, it should be understood that the present invention may be embodied in the following forms.

Figure 7A:
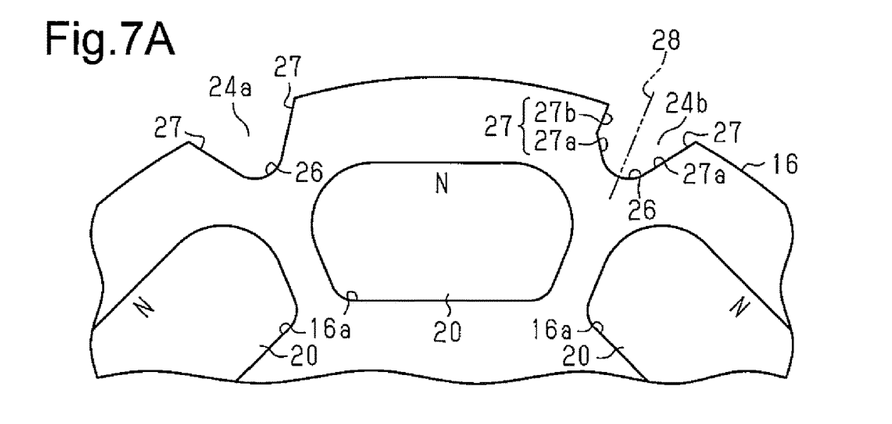
FIG. 7A is a schematic view showing the shape of a groove in a further embodiment.

The grooves 24b, which have a narrower width than the grooves 24a, does not necessarily have to have a generally U-shaped cross section so that the width at the open end of each groove 24b opposing the stator 12 is narrower than the opening end of each groove 24a opposing the stator 12. For example, as shown in FIG. 7A, one of the side surfaces 27 of the grooves 24b includes the planar surface 27a that is smoothly continuous with the arcuate bottom surface 26 and the planar surface 27b that extends parallel to a hypothetical plane 28 lying along the rotation axis of the rotor core 16 and bisecting the bottom surface 26. The other one of the side surfaces 27 of the grooves 24b includes only the planar surface 27a that is smoothly continuous with the arcuate bottom surface 26.

Even when the bottom surfaces 26 of the grooves 24a have the same radius of curvature as the bottom surfaces 26 of the grooves 24b, the width at the open end of each groove 24b may be narrower than the width at the open end of each groove 24a as long as the planar side surfaces of the grooves 24b are less inclined than the planar side surfaces of the grooves 24a.

The distance between the planar side surfaces of each groove 24b may decrease toward the open end.

Figure 7B:
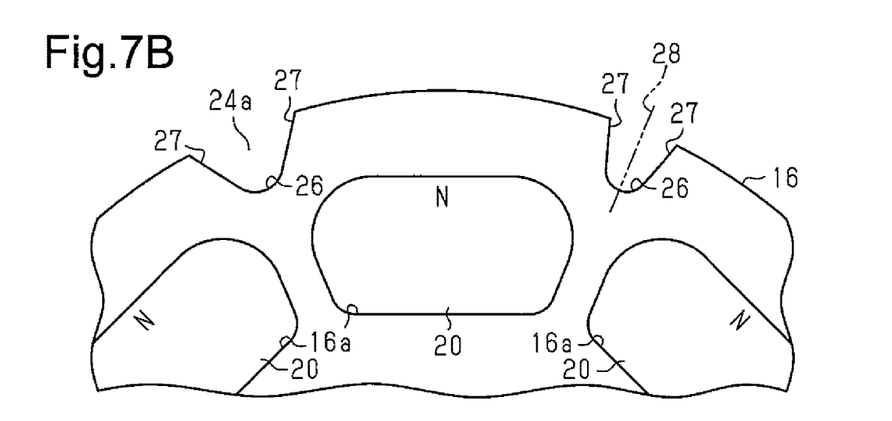
FIG. 7B is a schematic view showing the shape of a groove in another embodiment.

The grooves 24b only need to have a narrower width than the grooves 24a. Thus, the radius of curvature of the bottom surface 26 of each groove 24b may differ from the radius of curvature of the bottom surface 26 of each groove 24a. Referring to FIG. 7B, when the bottom surface 26 of each groove 24b has a smaller radius of curvature than the bottom surface 26 of each groove 24a, the side surfaces 27 of the groove 24b may both be formed by a single planar surface that is smoothly continuous with the arcuate bottom surface 26. However, the stress reduction effect of the bottom surface 26 differs in accordance with the radius of curvature. Thus, it is preferred that the bottom surfaces 26 of both of the grooves 24a and 24b have the same radius of curvature to obtain a large stress reduction effect.

The grooves 24b do not have to be shaped so that the side surfaces 27 each include one or two planar surfaces. Each side surface may be bent to include three or more planar surfaces.

The grooves 24b may be shaped so that the side surfaces 27 each includes a planar surface and a curved surface. For example, each groove 24b may be shaped so that the side surface 27 includes a planar surface that extends in a direction intersecting the tangential direction of the bottom surface 26 and a curved surface that smoothly connects the planar surface and the bottom surface.

The two side surfaces 27 of each of the grooves 24a and 24b may be symmetric or non-symmetric with respect to the hypothetical plane 28 that lies along rotation axis of the rotor core 16 and bisects the bottom surface 26.

Figure 8:
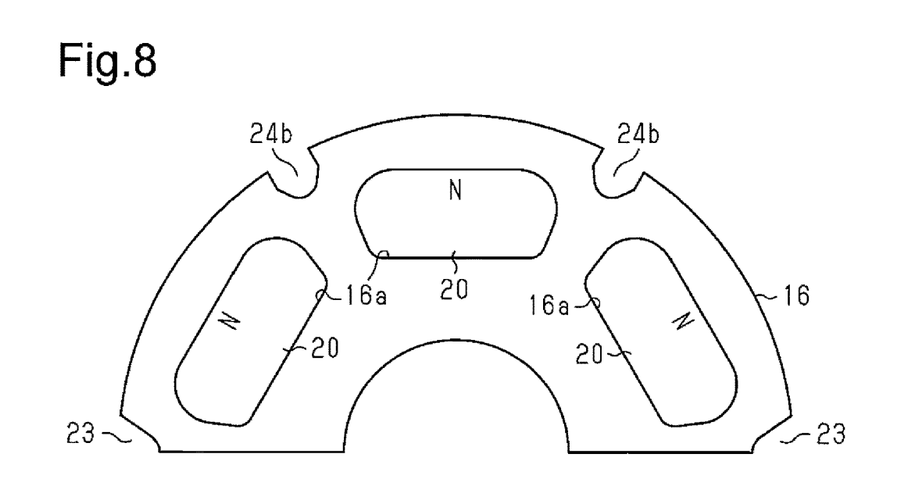
FIG. 8 is a partial plan view of a rotor in a further embodiment.

The permanent magnets 20 and 21 may both be provided in any number as long as the number is a plurality. For example, as shown in FIG. 8, there may be three permanent magnets 20 and three permanent magnets 21. In this case, the outer circumferential surface of the rotor core 16 includes the grooves 24b at locations corresponding to the position between the permanent magnets 20 that are adjacent to each other and in which the same poles are opposed to the stator.

The permanent magnets 20 and 21 do not have to be shaped as illustrated in the above embodiment in which the two corners at the side corresponding to the stator 12 have a larger radius of curvature than the two corners at the opposite side. For example, the permanent magnets 20 and 21 may be rectangular. Alternatively, the permanent magnets 20 and 21 may be rectangular in which the four corners are rounded to have a small radius of curvature or in which two opposite ends are arcuate.

There may be two permanent magnets 20, in which the N-poles are opposed to the stator 12, and two permanent magnets 21, in which the S-poles are opposed to the stator 12. However, it is preferred that there be three or more of the permanent magnets 20 and three or more of the permanent magnets 21.

The grooves 24a and 24b in the outer circumferential portion of the rotor core 16 located between the permanent magnets 20, the N-poles of which oppose the stator 12, and between the permanent magnets 21, the S-poles of which oppose the stator 12, do not all necessarily have to be located between the permanent magnets 20 and 21. Some of the grooves 24a and 24b may be eliminated.

The present examples and embodiments are to be considered as illustrative and not restrictive, and the invention is not to be limited to the details given herein, but may be modified within the scope and equivalence of the appended claims.

The invention claimed is:

1. A permanent magnet type rotating electric machine comprising:
   a stator;
   a rotor core including magnet insertion holes; and
   permanent magnets respectively inserted into the magnet insertion holes and fixed to the rotor core, wherein
   the permanent magnets include N-pole magnets, each of which an N-pole is opposed to the stator, and S-pole magnets, each of which an S-pole is opposed to the stator,
   the N-pole magnets are arranged adjacent to each other in a circumferential direction and form a first set,
   the S-pole magnets are arranged adjacent to each other in the circumferential direction and form a second set,
   the first set and the second set are arranged along the same circumference, and
   the rotor core includes an outer circumferential portion that includes a groove at a location corresponding to a position between the N-pole magnets that are adjacent to each other in the circumferential direction and a groove at a location corresponding to a position between the S-pole magnets that are adjacent to each other in the circumferential direction, wherein:
   the N-pole magnets are three or more in number,
   the S-pole magnets are three or more in number,
   among the permanent magnets of the same pole successively arranged in the circumferential direction, the permanent magnet located in the middle is referred to as a first permanent magnet and the permanent magnets located at the two sides of the first permanent magnet in the circumferential direction are referred to as the second permanent magnet and the third permanent magnet,
   the groove at a location corresponding to a position between the first and second permanent magnets is referred to as a first groove,
   the groove at a location corresponding to a position between the first and third permanent magnets is referred to as a second groove, and
   the first groove has a narrower width than the second groove.

2. The permanent magnet type rotating electric machine according to claim 1, wherein each groove includes an arcuate bottom surface and two planar side surfaces that are continuous with the bottom surface.

3. The permanent magnet type rotating electric machine according to claim 1, wherein
   the first groove includes an arcuate bottom surface, and
   the second groove includes an arcuate bottom surface having a radius of curvature that is equal to that of the bottom surface of the first groove.

4. The permanent magnet type rotating electric machine according to claim 1, wherein
   the first groove and the second groove each have a bottom surface and two planar side surfaces that are continuous with the bottom surface,
   the side surfaces of the first groove are parallel to each other, and
   the side surfaces of the second groove are spaced apart by a distance that increases as the bottom surface becomes farther.

5. The permanent magnet type rotating electric machine according to claim 2, wherein the bottom surface of each groove is located radially outward from a hypothetic line connecting radially outer surfaces of the permanent magnets.

6. The permanent magnet type rotating electric machine according to claim 1, wherein the permanent magnet type rotating electric machine is a rotating electric machine for a centrifugal compressor.

* * * * *